(12) United States Patent
Shaik (10) Patent No.: US 9,877,154 B2
(45) Date of Patent: Jan. 23, 2018

(54) METHOD AND APPARATUS FOR PROVIDING TARGET LOCATION REMINDERS FOR A MOBILE DEVICE

(71) Applicant: Google Inc., Mountain View, CA (US)

(72) Inventor: Moulaali Shaik, Milpitas, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/016,924

(22) Filed: Feb. 5, 2016

(65) Prior Publication Data
US 2017/0230792 A1 Aug. 10, 2017

(51) Int. Cl.
*H04W 24/00* (2009.01)
*H04W 4/02* (2009.01)
*G06F 3/0482* (2013.01)
*G06F 3/0484* (2013.01)

(52) U.S. Cl.
CPC .......... *H04W 4/022* (2013.01); *G06F 3/0482* (2013.01); *G06F 3/04842* (2013.01); *G06F 3/04847* (2013.01); *H04W 4/021* (2013.01); *H04W 4/027* (2013.01); *H04W 4/028* (2013.01)

(58) Field of Classification Search
CPC ................................ H04W 4/021; H04W 4/02
USPC ................. 455/456.3, 456.2; 340/540, 686.1
See application file for complete search history.

(56) References Cited

U.S. PATENT DOCUMENTS

| 7,493,211 | B2 * | 2/2009 | Breen | ................... | G01S 5/0027 340/995.12 |
| 8,018,329 | B2 | 9/2011 | Morgan et al. | | |
| 8,924,147 | B2 * | 12/2014 | Vellaikal | ............ | G06Q 30/0266 701/400 |
| 2005/0156715 | A1 * | 7/2005 | Zou | ..................... | B60R 25/1025 340/426.19 |
| 2005/0216301 | A1 * | 9/2005 | Brown | ................... | G06Q 10/02 705/5 |
| 2007/0143013 | A1 * | 6/2007 | Breen | ................... | G01S 5/0027 701/32.3 |
| 2008/0079566 | A1 | 4/2008 | Singh et al. | | |

(Continued)

OTHER PUBLICATIONS

How to set location-based reminders on your cell phone; from www.whistleout.com; Jul. 15, 2014.

(Continued)

*Primary Examiner* — William D Cumming
(74) *Attorney, Agent, or Firm* — Troutman Sanders LLP; James E. Schutz; Brennan M. Carmody (57) ABSTRACT

A method and apparatus for providing target location reminders for a mobile device may take into account the estimated time that it will take the mobile device to reach a target location based on a current location of the mobile device, based on a current mode of transportation of the mobile device and also based on current traffic conditions to reach a target location (808). In another example, a method and apparatus for providing target location reminders for a mobile device may dynamically change a geo-fence perimeter to include an area larger than a previously set geo-fence in response to a determined frequency of location visits of the mobile device (810). In another example, an apparatus and method may operate in a mode that automatically provide target location reminders taking into consideration common mobile device locations also referred to as an extension mode from favorite locations (812).

17 Claims, 10 Drawing Sheets

(56) References Cited

U.S. PATENT DOCUMENTS

| | | | |
|---|---|---|---|
| 2009/0164118 A1* | 6/2009 | Breen | G01S 5/0027 701/408 |
| 2010/0295676 A1* | 11/2010 | Khachaturov | G06Q 10/109 340/540 |
| 2012/0302258 A1* | 11/2012 | Pai | H04W 4/02 455/456.2 |
| 2012/0306659 A1* | 12/2012 | Ben-Dayan | G08B 21/0261 340/686.1 |
| 2012/0306660 A1 | 12/2012 | Stopel et al. | |
| 2012/0310527 A1* | 12/2012 | Yariv | G01C 21/3679 701/426 |
| 2013/0006522 A1* | 1/2013 | Vellaikal | G06Q 30/0266 701/426 |
| 2013/0099977 A1* | 4/2013 | Sheshadri | H04W 4/021 342/450 |
| 2013/0178233 A1* | 7/2013 | McCoy | H04W 4/021 455/456.3 |
| 2013/0225196 A1* | 8/2013 | James | H04W 4/022 455/456.1 |
| 2013/0231137 A1* | 9/2013 | Hugie | H04W 24/00 455/456.3 |
| 2013/0253828 A1* | 9/2013 | Ignatin | G01C 21/3691 701/533 |
| 2013/0324160 A1 | 12/2013 | Sabatellil et al. | |
| 2014/0156410 A1* | 6/2014 | Wuersch | G06Q 30/0261 705/14.58 |
| 2014/0180817 A1* | 6/2014 | Zilkha | G06Q 30/02 705/14.55 |
| 2014/0279297 A1* | 9/2014 | Morgan | G06Q 10/087 705/28 |
| 2014/0365304 A1* | 12/2014 | Showers | G06Q 30/02 705/14.55 |
| 2015/0106448 A1* | 4/2015 | Ownbey | H04W 4/02 709/204 |
| 2015/0148061 A1 | 5/2015 | Koukoumidis et al. | |
| 2015/0181382 A1 | 6/2015 | McDonald et al. | |
| 2015/0237470 A1* | 8/2015 | Mayor | H04W 4/021 455/456.2 |
| 2015/0249718 A1* | 9/2015 | Huybregts | G06K 9/00228 709/202 |
| 2015/0373493 A1* | 12/2015 | Chowdhury | H04L 51/38 455/456.3 |
| 2016/0007151 A1* | 1/2016 | Birch | H04W 4/021 455/456.3 |
| 2016/0014564 A1 | 1/2016 | Del Vecchio et al. | |
| 2016/0066864 A1* | 3/2016 | Frieder | A61B 5/7282 600/300 |
| 2016/0358451 A1* | 12/2016 | Adler | G08B 21/24 |
| 2017/0230792 A1* | 8/2017 | Shaik | G06F 3/04847 |

OTHER PUBLICATIONS

Office Action from Related United Kingdom Patent Application No. GB1622434.7, dated May 23, 2017, 8 pages.
PCT/US2016/069247 International Search Report and Written Opinion dated Jul. 20, 2017.

\* cited by examiner

FIG. 12

METHOD AND APPARATUS FOR PROVIDING TARGET LOCATION REMINDERS FOR A MOBILE DEVICE

BACKGROUND OF THE DISCLOSURE

The disclosure relates to methods and apparatus that provide target location reminders for a mobile device such as, but not limited to, those that support a geo-fence based technique for providing target location reminders for a user of the mobile device.

Wireless mobile devices such as smart phones, tablets, laptops, wearables, and other mobile devices may employ target location reminders for users of the mobile device using various techniques. One technique includes employing static predefined geo-fences (or nearness radius areas) that a user may set by dragging a graphic representation of a circle on a device touch screen or otherwise defining a predefined area around a target reminder location so that when the mobile device enters the predefined geo-fence, the mobile device provides the user with an audible and/or visual reminder.

For example, if a user wants to be notified when they are close to a particular pharmacy, the user can either through an application user interface, or through accessing a website, set a predefined geo-fence area around a target location. Using known techniques such as GPS location units within the mobile device, or location units that are in servers (e.g., web server) that receive location transmissions from the mobile device, the mobile device can be detected either inside or outside the geo-fence. The mobile device itself or a server can determine through the use of a location unit (e.g., GPS receiver) the location of the mobile device and compare the location to the geographic area of the geo-fence. If the mobile device is within the geo-fence, then the mobile device provides the user with a tactile, audible, and/or visual location notification reminder that the user is close to a target location and an event description can be presented on the device display such as "pick up medication from pharmacy". Geo-fences can be linked to a user's calendar events so that, for example, the mobile device notifies a user based on calendar events on a particular day when their mobile device is within the geo-fence corresponding to an event in a calendar. Other uses of geo-fence techniques are also known.

However, setting static predefined geo-fences or other type of geo-fence settings for use in reminding the user based on the mobile device location can fail to take into account important considerations that can have an impact on the user reminder experience.

BRIEF DESCRIPTION OF THE DRAWINGS

The disclosure will be more readily understood in view of the following description when accompanied by the below figures and wherein like reference numerals represent like elements, wherein.

DETAILED DESCRIPTION OF EMBODIMENTS

Briefly, in one example, a method and apparatus for providing target location reminders for a mobile device takes into account the estimated time that it will take the mobile device to reach a target location based on a current location of the mobile device, based on a current mode of transportation of the mobile device, and also based on current traffic conditions to reach a target location. In another example, a method and apparatus for providing target location reminders for a mobile device dynamically changes a geo-fence perimeter to include an area larger than a previously set geo-fence in response to a determined frequency of location visits of the mobile device. As such, the frequency of user visits (i.e., the number of visits) is taken into account as a consideration for changing the size of the geo-fence. For example, if the target location is a location that a user of the mobile device rarely visits, it may be worth taking an extra detour to reach the reminder target location to finish a task. As such, the size of the geo-fence can be dynamically changed from an initial setting to a different size based on a frequency of prior visits to a location.

In another example, an apparatus and method may automatically provide target location reminders taking into consideration common device locations. For example, an apparatus and method may access stored mobile device common location data and determine a common mobile device location, such as a user's home or office and automatically set a geo-fence area based on the current location of the mobile device as a function of a distance from the determined common mobile device location. By way of example, if a user is already twenty miles from home and a target location is just two miles further out, the geo-fence can be expanded to include the target location. Methods and apparatus employing any suitable combination of the above operations can also be employed.

By way of further example, a method and apparatus for providing target location reminders for a mobile device includes receiving, by a geo-fence reminder controller, a target location within a first geo-fence, the first geo-fence having a corresponding nominal travel time to reach the target location from a perimeter of the first geo-fence using a first transportation mode. The geo-fence reminder controller determines an estimated travel time to reach the target location by the mobile device based on a current location of the mobile device, a current mode of transportation of the mobile device, and current traffic conditions. The geo-fence reminder controller dynamically changes the first geo-fence to a second geo-fence having a different area in response to determining that the estimated travel time for the mobile device to the target location is within a desired temporal range of the nominal travel time, and outputs to a user interface, a reminder notification for the target location when the mobile device enters the second geo-fence.

In another example, the method and apparatus for providing target location reminders for a mobile device further includes providing a user interface output component, such as a graphics user interface, that presents a plurality of transportation modes for selection by a user (e.g., instead of user, an automatic transportation mode). In another example, the method and apparatus for providing target location reminders for a mobile device further includes determining the nominal travel time to reach the target location from a perimeter of the first geo-fence based on the first transportation mode and average traffic conditions using the first transportation mode. In another example, the method and apparatus for providing target location reminders for a mobile device further includes dynamically changing the first geo-fence to a second geo-fence having a different area by increasing the area of the second geo-fence when the estimated travel time is less than or equal to the nominal travel time, and the current location of the mobile device is outside the first geo-fence.

In another example, the method and apparatus for providing target location reminders for a mobile device further includes dynamically changing the first geo-fence to a second geo-fence by shaping (e.g., providing a polygon shaped geo-fence using streets as boundaries) the second geo-fence in response to traffic conditions between the current location and the target location. In another example, the method and apparatus for providing target location reminders for a mobile device further includes providing a user interface input component with selectable static geo-fence mode data and selectable dynamic geo-fence mode data, such as selectable virtual (touchscreen graphics mode) or physical buttons.

In yet another example, a method for providing target location reminders for a mobile device includes obtaining, by a geo-fence reminder controller, a current location of the mobile device, accessing stored mobile device common location data and determining a common mobile device location from the stored mobile device common location data. The method also includes automatically setting a geo-fence area based on the current location as a function of a distance from the determined common mobile device location, and providing a reminder notification for a target location located in the geo-fence area. An apparatus that can carry out the method is also described.

In another example, the method and apparatus for providing target location reminders for a mobile device further includes automatically setting a geo-fence area based on the current location as a function of a distance from the common mobile device location by expanding a first geo-fence to a larger second geo-fence for the target location in response to a current mobile device location being a common mobile device location.

In another example, a method and apparatus for providing target location reminders for a mobile device includes changing a shape of the first geo-fence in response to traffic conditions between the current location and the target location.

In yet another example, a method and apparatus for providing target location reminders for a mobile device includes obtaining, by a geo-fence reminder controller, an indication of a first geo-fence corresponding to a target location, modifying, by the geo-fence reminder controller, the first geo-fence to establish a second geo-fence having an area larger than the first geo-fence in response to a determined frequency of locations of the mobile device within the first geo-fence being below a threshold, and providing a reminder notification for the target location when the mobile device enters the second geo-fence having an area larger than the first geo-fence. The above methods and apparatus may also be combined as desired to provide a multimode target reminder solution.

Figure 1:
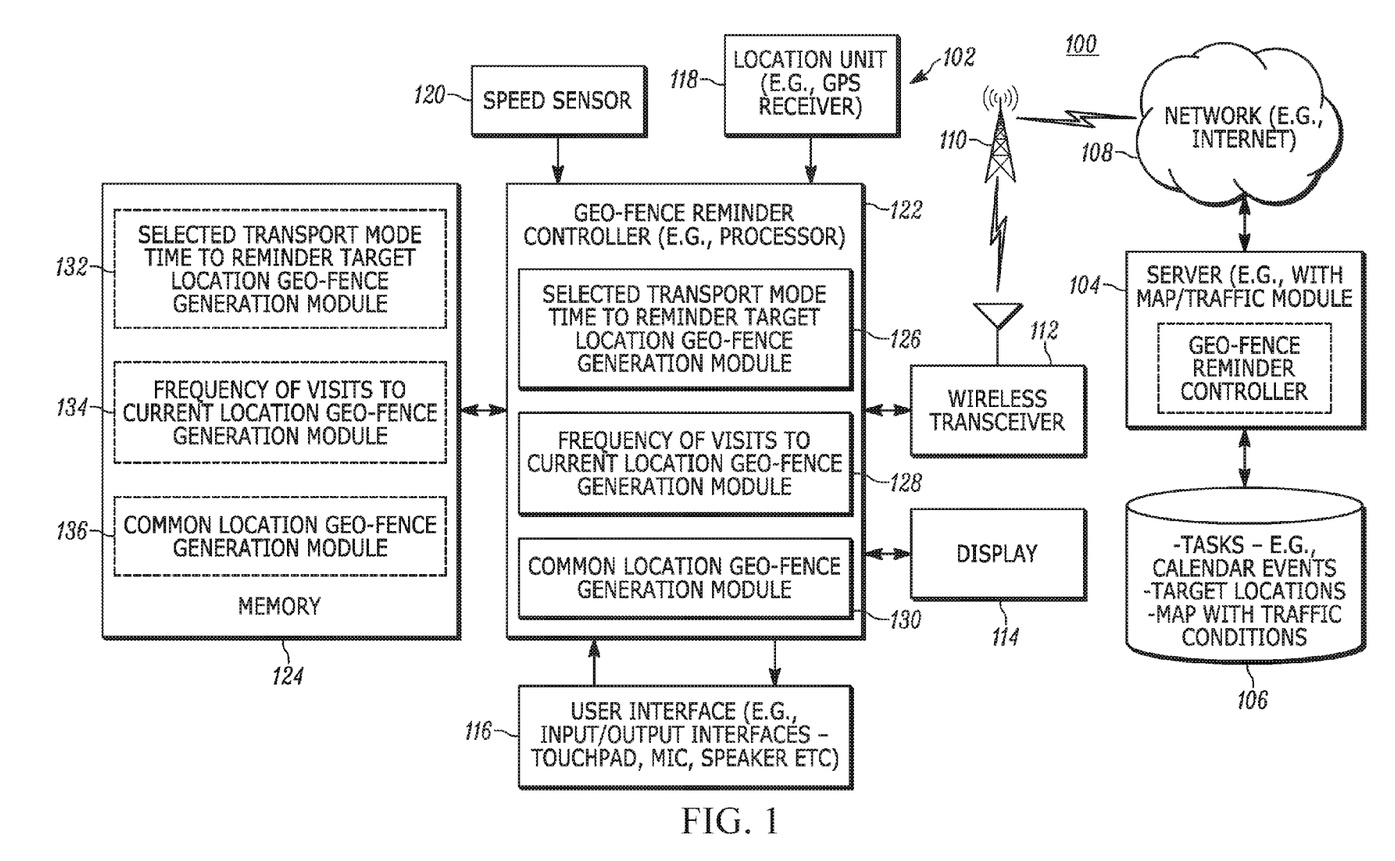
FIG. 1 illustrates one example of a system for providing target location reminders for a mobile device in accordance with one example set forth in the disclosure.

FIG. 1 illustrates one example of a system 100 for providing target location reminders for a mobile device 102. The system includes a server 104 that is in communication with the wireless device 102 through any suitable network 108 (e.g., the Internet) and/or through any suitable wireless infrastructure 110 such as one or more cellular network infrastructures, Wi-Fi infrastructure, or any other suitable WWAN, WLAN or peer-to-peer network as desired. The server may include database 106 if desired.

The mobile device 102 is a wireless mobile device and includes a wireless transceiver 112, display 114 for providing a user interface input/output component (e.g., graphic user interface), additional user interface input and output components 116, location unit 118, and speed sensor 120 as known in the art. In addition, the mobile device 102 includes a geo-fence reminder controller 122 and memory 124 accessible by the controller 122. In this example, the geo-fence reminder controller 122 may be implemented as any suitable logic circuitry such as one or more processors that when programmed using computer readable program code stored in memory 124, is operative to carry out the operations described herein. The memory 124 may be any suitable non-transitory memory including, but not limited to, RAM, ROM, a flash drive or any suitable computer program product. The processor may be, for example, a central processing unit, digital signal processor, field programmable array, APU, or any other suitable processor. It will be recognized, however, any suitable logic circuitry may be employed for the controller 122 including ASICs, state machines or other suitable logic circuitry. The functions of the geo-fence reminder controller 122 may also be incorporated within the server 104 or distributed in multiple devices as desired. The user interface 116 may include, for example, a graphic user interface touchscreen, display speakers, microphones, or any other suitable input/output interfaces as desired. The touch screen as known in the art may be incorporated as part of the display 114.

The server 104 may provide street map images for the wireless device 102 as known in the art and may also provide traffic data for street maps to the mobile device 102 through a traffic service as known in the art. The server 104 may also store in database 106, the tasks for which the geo-fence is used which may include calendar events with target locations and may also store the map and traffic conditions if desired. It will be recognized that the target location information, tasks and other information may be stored in the mobile device 102 instead of, or in addition to, the database 106 if desired. The user of the mobile device may be provided with an option to control whether a user's calendar, location, or other data is used.

For purposes of illustration only, three different modes of operation will be described and it will be recognized that any of the three modes may be used alone or in any suitable combination if desired, and it will be assumed that control and permission has been granted by the user. As illustrated, the geo-fence reminder controller 122 includes a transport mode time to reminder target location geo-fence generation module 126, a frequency of visits to current locations geo-fence generation module 128, and a common location geo-fence generation module 130. Each of the modules 126, 128, and 130 may be implemented as part of a programmed processor that executes corresponding stored executable code illustrated as stored code 132, 134, and 136, respectively. However, the modules 126, 128, and 130 may also be implemented as separated integrated circuits if desired, separate state machines, ASICs, or as any other suitable logic circuitry.

Figure 2:
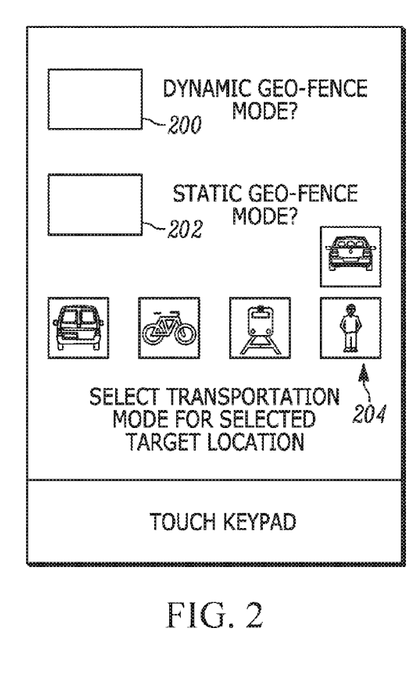
FIG. 2 illustrates one example of a user interface for providing target location reminders in accordance with one example set forth in the disclosure.

Referring also to FIG. 2, the geo-fence reminder controller 122 may present a graphic user interface on display 114 that allows a user to select between a dynamic geo-fence mode 200 and a static geo-fence mode 202 through selectable user interface controls such as virtual buttons. In the static geo-fence mode, a conventional operation is performed where a user may drag, for example, a circle around a target reminder location to set a distance or radius for the geo-fence and the geo-fence will not change. If the user selects the dynamic geo-fence mode 200, the user may be presented with a graphic user interface shown in FIG. 3 to allow selection of a particular type of geo-fence mode. The user may also select a transportation mode that the user will use in reaching the target location. In this example, the user may select driving, public transportation, bicycle transportation, train transportation, or walking. The mode of transportation of the mobile device will then be used to determine an estimated travel time to reach the target location along with a current location of the mobile device and current traffic conditions. The mode of transportation may be selected through any number of transportation mode buttons 204 or may be automatically determined by the mobile device or server based on speed of the mobile device or other parameters.

Figure 3:
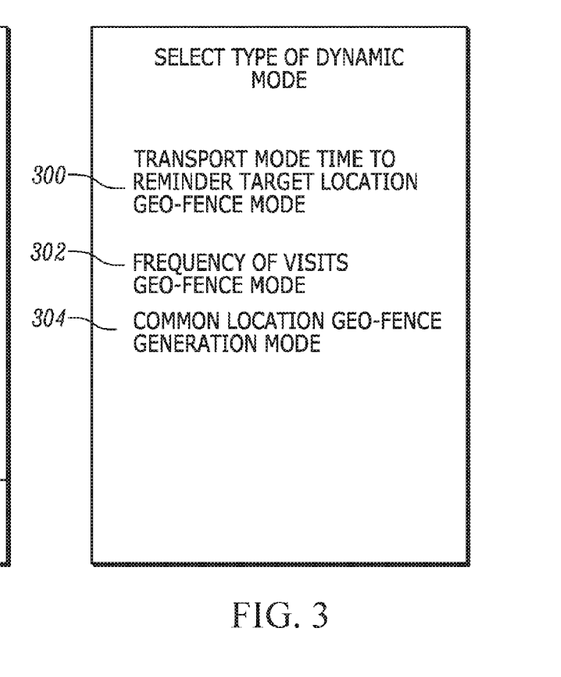
FIG. 3 illustrates one example of a user interface for providing target location reminders in accordance with one example set forth in the disclosure.

Referring to FIG. 3, in one example, after the dynamic geo-fence mode 200 has been selected, one or more of the three different dynamic geo-fence modes may be selected corresponding to the modules 126, 128, and 130. For example, the transport mode time to reminder target location geo-fence mode 300 may be selected, the frequency of visits geo-fence mode 302 may be selected, and/or the common location geo-fence generation mode 304 may be selected using the graphic user interface buttons or audible selection. The user may select a user interface selection mechanism such as illustrated text, button, or other user interface mechanism corresponding to each respective mode. The geo-fence reminder controller 122 provides a user interface component such as a graphic user interface (or voice activated interface) with selectable static geo-fence mode option 202 and selectable dynamic geo-fence mode option 200 plus further mode options 300, 302 and 304 to allow selectability of different types of dynamic geo-fence modes. Each of the three dynamic geo-fence modes will be described with reference to FIGS. 5, 6, and 7 below.

Figure 4:
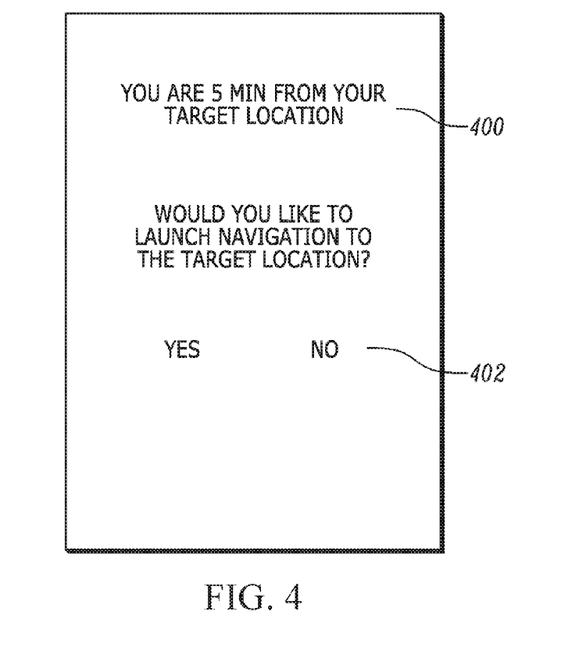
FIG. 4 illustrates one example of a user interface for providing target location reminders in accordance with one example set forth in the disclosure.

FIG. 4 illustrates an example of a graphic user interface that provides a user notification 400. This may be presented after any dynamic geo-fence has been generated and the mobile device is within a specified time of arrival range to a target location. In this example, the mobile device is within five minutes from the target location based on the estimated time of arrival taking into account the current mode of transportation of the mobile device and a current traffic condition (e.g., unimpeded streets vs. congested streets). The user may then launch a navigation map through a selection button 402 to the target location by selecting "yes" or "no" or through any other suitable mechanism. If the user selects "yes", the display then shows a map and target location on the map so that the user can navigate to the target location as desired.

Figure 5:
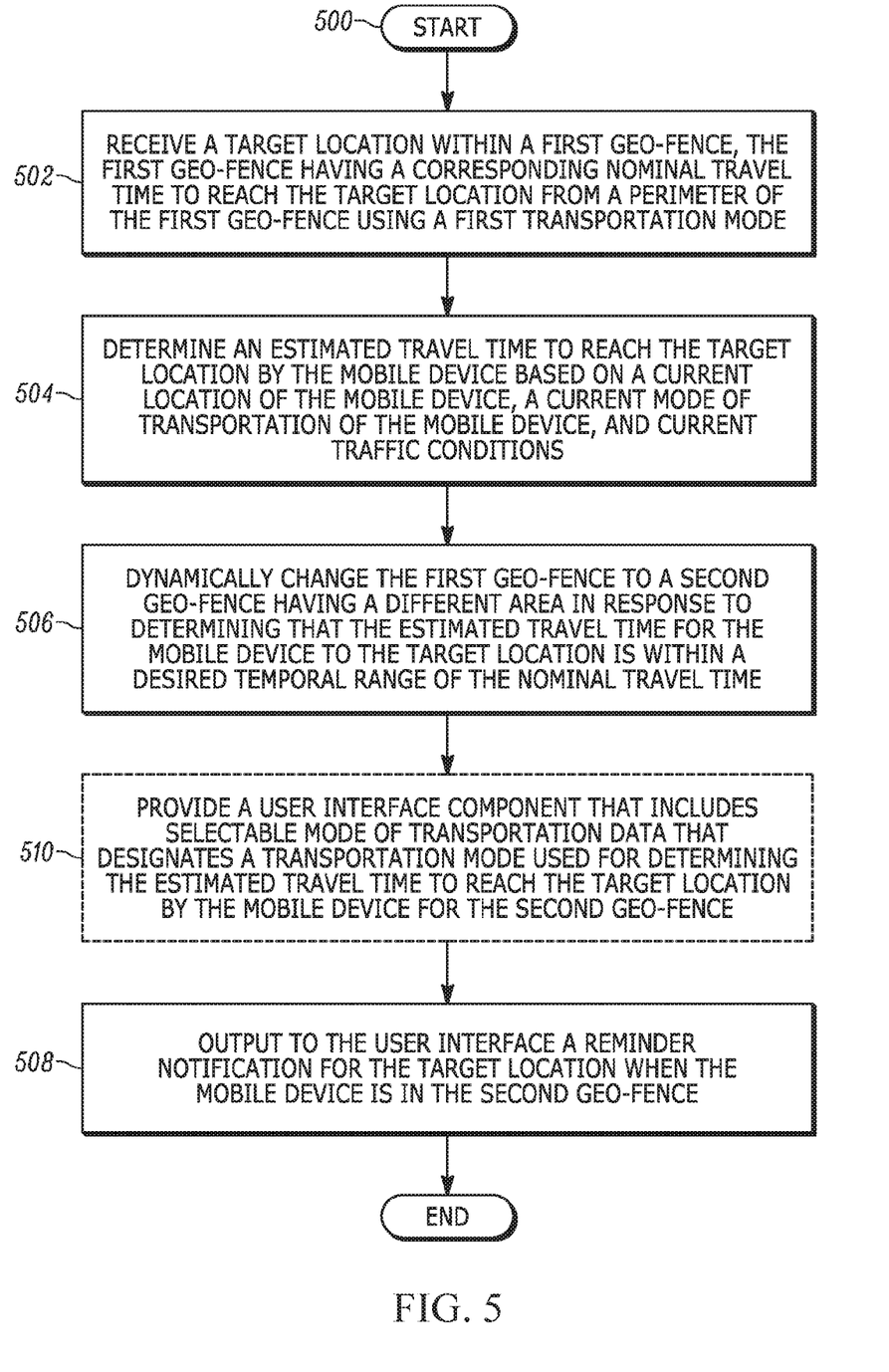
FIG. 5 illustrates one example of a flowchart illustrating one example of a method for providing target location reminders for a mobile device in accordance with one example set forth in the disclosure.
Figure 9:
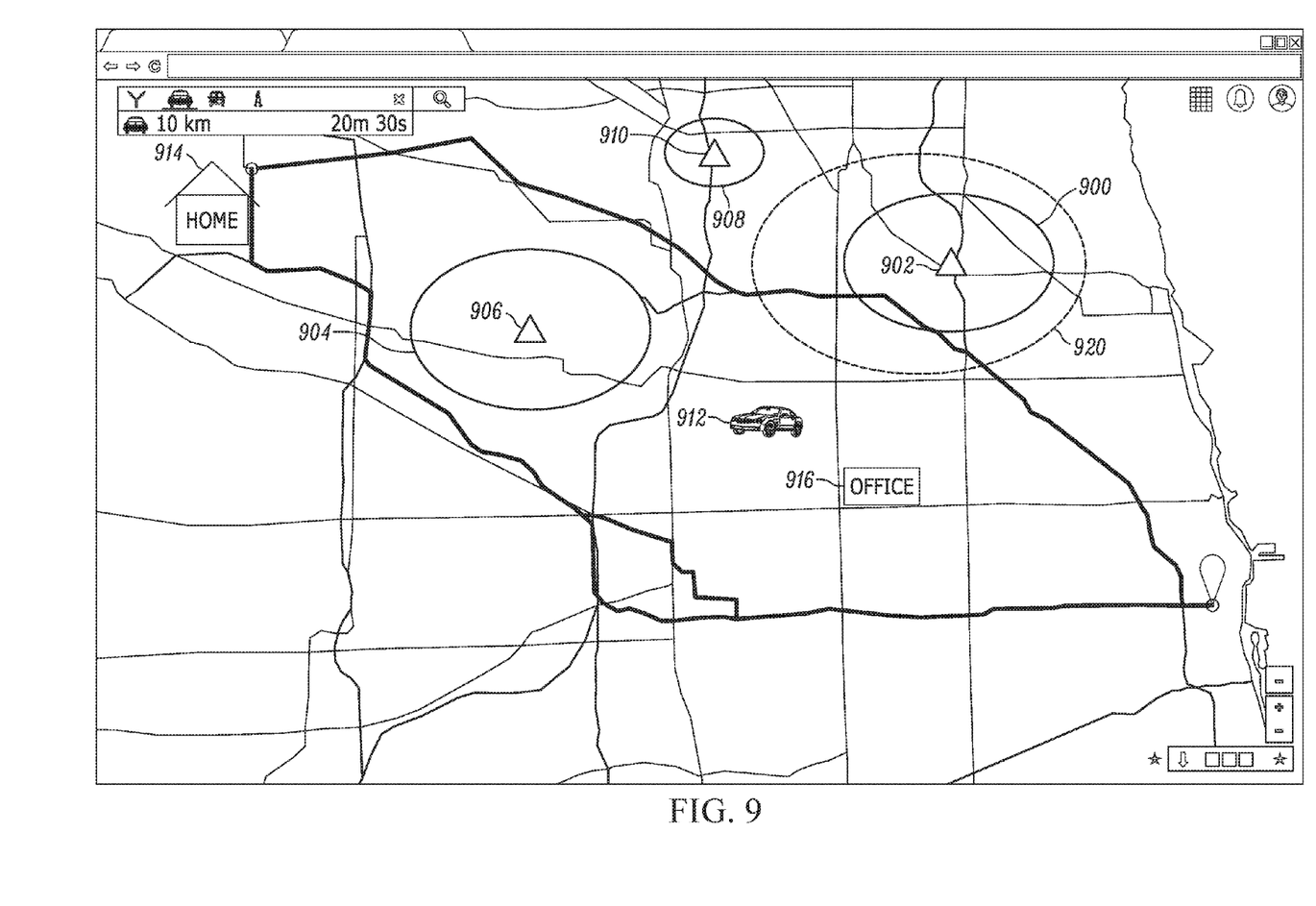
FIG. 9 illustrates one example of a user interface illustrating an example of providing target location reminders for a mobile device in accordance with one example set forth in the disclosure.

Referring to FIGS. 5 and 9, the transport mode time to reminder target location geo-fence generation module 126 operation will be described. The method of FIG. 5 may be carried out, for example, by the geo-fence reminder controller 122 and in particular, the transport mode time to reminder target location geo-fence generation module 126. The mobile device may be, for example, a smart phone located in vehicle 912 or may be the navigation system within vehicle 912. In operation, as shown by block 500, the method begins by, for example, having initial geo-fences set up for respective target locations. For example, as illustrated in FIG. 9, geo-fence 900 is set with respect to target location 902, another geo-fence 904 is set with respect to target location 906, and geo-fence 908 is set with respect to target location 910. The target locations 902, 906 and 910 may be pulled from the user's calendar application on the mobile device, or other service, or may be set by a user through a suitable user interface as known in the art. Also shown are the user's residence or "home" location 914 and the user's work location represented by the "office" location 916. These locations may be designated by a user or may be determined based on a frequency of occurrence that the mobile device visits the location as further described below. The geo-fences 900, 904, and 908 may be automatically set by the geo-fence reminder controller 122 by the user entering a nominal travel time (e.g., 5 minutes calculated using unobstructed traffic conditions) to reach the respective target location given a time to reach the target location from a perimeter of the first geo-fence using, for example, a selected vehicle transportation mode (e.g., car). For example, through the user interface, the user may indicate that he/she wishes to have a geo-fence range so that it takes five minutes by car during normal traffic conditions at that time or a certain time of day to reach the target location. As such, any given target may have a first geo-fence associated therewith defined by a nominal travel time (e.g., 5 min) to reach the target location from a perimeter of the first geo-fence using a first transportation mode (e.g., by car). Alternatively, any of the geo-fences 900, 904, and 908 may also be initially set as static geo-fence based on distance.

The method includes receiving 502 a target location such as location 902 within a first geo-fence 900. This target location data may come from the user's calendar application, or any suitable database that stores the target location. As noted above, the first geo-fence 900 has a corresponding nominal travel time to reach the target location from a perimeter of the first geo-fence using the selected transportation mode. The method includes determining 504 an estimated travel time to reach the target location 902 by the mobile device 912 based on a current location of the mobile device, a current mode of transportation of the mobile device, and current traffic conditions. In this example, the geo-fence reminder controller 122 may obtain the current location of the mobile device 102 via location unit 118. A current mode of transportation of the device may be set by the user via the user interface shown in FIG. 2, or may be determined by the mobile device 102 based on its speed from speed sensor 120 such as an accelerometer of a GPS receiver, or through any suitable mechanism. The current traffic conditions may be obtained, for example, from server 104 that provides current traffic conditions given the location of the mobile device. For example, the geo-fence reminder controller 122 obtains the current traffic conditions from a traffic application from a web server such as Google maps or other service and calculates the amount of time estimated for the mobile device to reach the target location from a current location using the obtained traffic condition information.

The geo-fence reminder controller dynamically changes 506 the first (initial) geo-fence 900 to a second (subsequent) geo-fence 920 having a different area, in response to determining that the estimated travel time (e.g., 6 minute) for the mobile device to the target location 902 is within a desired temporal range (e.g., 1 min) of nominal travel time (e.g., 5 minutes). For example, the module 126 may produce the enlarged second geo-fence that may also change in shape if it is determined that the estimated time to the reminder target from the second geo-fence perimeter is within a desired temporal range of one minute arrival time due to improved traffic conditions and based on transportation mode. The enlarged geo-fence may be expanded to include an area that includes a travel time of 6 minutes to the target location. As an example, if the estimated travel time from the mobile device's current location to the target location is equivalent to the nominal time of 5 minutes plus a desired temporal range of 1 minute, the module 126 may dynamically calculate a subsequent geo fence. The desired temporal range may be set by a user through the user interface (e.g., FIG. 3) to 20% of the nominal travel time or any other suitable amount. Also the desired temporal range may be preset so that no user selection is required.

Also the geo-fence reminder controller 122 may also generate a transportation mode recommendation to change transportation modes. For example, if the mode of transportation were, for example, by auto and there were traffic delays on the roads traveled by auto, it may be much faster to take public transportation (e.g., train) and the estimated time to reminder target may be enlarged due to the traffic congestion and the user would be notified that they can take public transportation instead of a car and still reach the target within the desired time frame. The notification may be through any suitable graphic user interface. As such, the geo-fence controller 122 determines that the estimated travel time for the mobile device to the target location is within the desired temporal range of the nominal travel time using a second transportation mode different from first transportation mode.

Stated another way, a distance of one mile to a target location may be easier to drive rather than walk, or it may be easier to take public transportation instead of driving to the target location. The time it takes to get to a reminder target as a cost factor is used to determine the effort involved in reaching the reminder target location. Using a transportation mode of the mobile device, current traffic conditions, as well as the time to reach a target helps adapt to a current user's context in an improved manner. The reminder will not be provided when the mobile device is within an initial geo-fence if the estimated travel time for the mobile device to the target location is outside of a desired temporal range of the nominal travel time (e.g., estimated it will take longer than 5+1 minutes to get to the target location from the perimeter of the initial geo-fence).

The method includes outputting 508 to the user interface a reminder notification for the target location when the mobile device is within the second geo-fence. For example, the user interface as shown in FIG. 4 may be provided indicating that the target location 902 is within the geo-fence 920 when the mobile device can reach the target location within five plus 15 minutes of its current location. As shown in block 510, if desired, the geo-fence reminder controller 122 may provide a user interface component such as a graphic user interface that includes the ability for the user to designate the desired temporal range and any other suitable settings.

As noted above, the transportation mode may be automatically determined by the geo-fence controller 122 through speed sensor information or may be provided by another device or from any other suitable source. As illustrated, for example, in FIG. 2, the method may include providing a user interface component that presents a plurality of transportation modes 204 for selection by a user. Also, the method includes determining the nominal travel time to reach the target location from a perimeter of the first geo-fence based on the first transportation mode and average traffic conditions of the first transportation mode instead of, for example, a time of day. The average traffic conditions may be provided by the server as known in the art that can provide traffic and map services to the geo-fence reminder controller.

Figure 11:
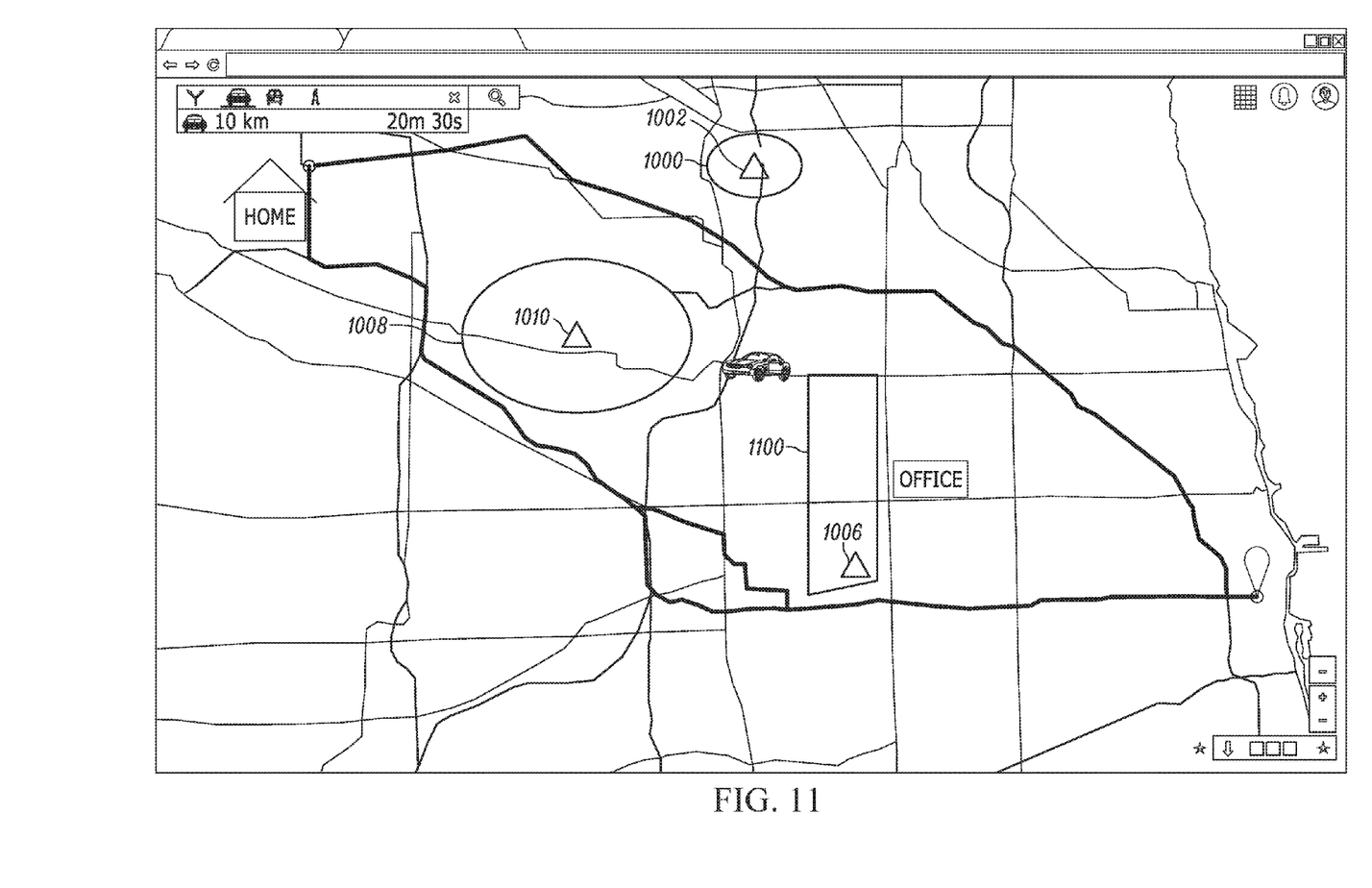
FIG. 11 illustrates one example of a user interface illustrating an example of providing target location reminders for a mobile device in accordance with one example set forth in the disclosure.

Dynamically changing the first geo-fence to a second geo-fence having a different area may include increasing the area of the second geo-fence 920 when the estimated travel time (e.g., 3 minutes) is less than or equal to the nominal travel time and when the current location of the mobile device is outside the first geo-fence. As noted, the geo-fence reminder controller 122 may also shape the second geo-fence 920 in response to traffic conditions between the current location and the target location to reflect boundaries defined, for example, by streets that may have particular traffic conditions so that the map, for example, as shown in FIG. 11 illustrates a polygon shaped geo-fence 1100 to define the area that allows the mobile device to reach the target device within the nominal travel time.

Figure 6:
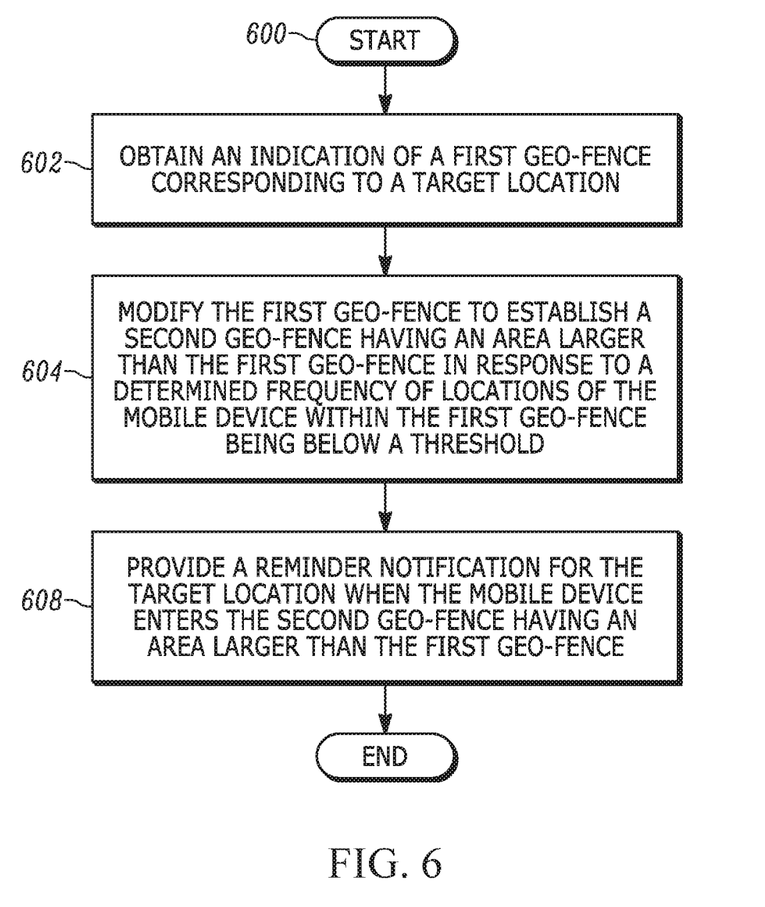
FIG. 6 illustrates one example of a flowchart illustrating one example of a method for providing target location reminders for a mobile device in accordance with one example set forth in the disclosure.
Figure 10:
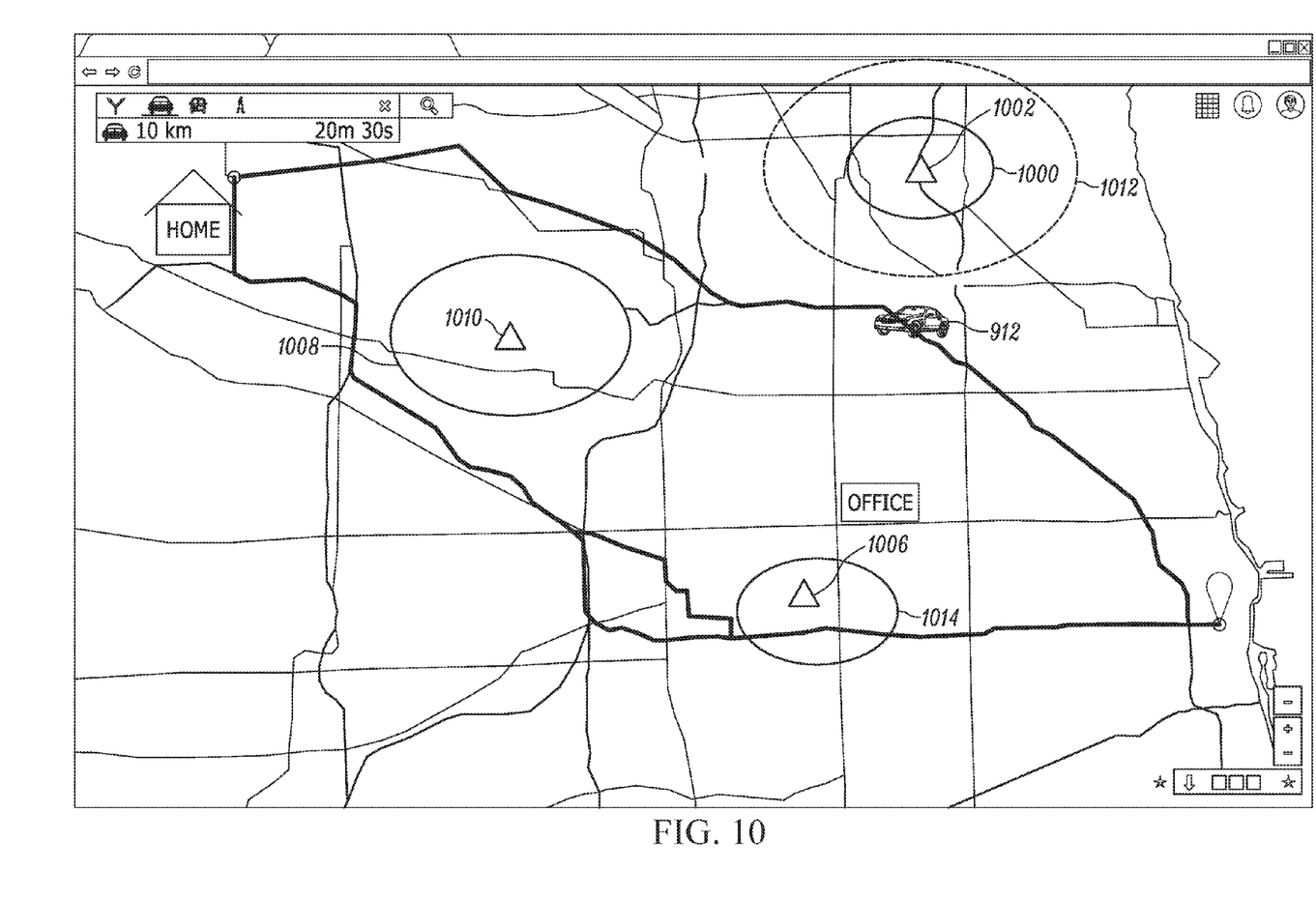
FIG. 10 illustrates one example of a user interface illustrating an example of providing target location reminders for a mobile device in accordance with one example set forth in the disclosure.

Referring to FIG. 6 and FIG. 10, in response to the user selecting the mode 302, the geo-fence reminder controller 122 obtains an indication of a first geo-fence corresponding to a target location wherein the first geo-fence may be initially set through a user selecting a radius around a location for which the user is reminded when the device is within that distance radius. The indication of the first geo-fence may also be obtained from memory 124 or server 104 wherein the first geo-fence is automatically set by, for example, the geo-fence reminder controller 122 using a default radius setting of, for example, a mile which is assigned for all target locations when the target locations are initially set up. As shown in FIG. 10, a first initial geo-fence 1000 corresponds to target location 1002, a second initial geo-fence 1004 corresponds to target location 1006, and third initial geo-fence 1008 corresponds to target location 1010.

As shown in block 600, the method starts by the first (i.e., initial) geo-fence being set with respect to a target location in any suitable manner as noted above. The geo-fence reminder controller 122 obtains 602, such as from memory 124, server 104 or other suitable source, an indication of the first geo-fence corresponding to a target location which may include the radius about a target location. The method includes modifying 604 the first geo-fence 1000 to establish a second (i.e., subsequent) geo-fence 1012 having an area larger than the first geo-fence 1000 in response to a determined frequency of locations of the mobile device 912 within the first geo-fence 1000 being below a threshold. For example, if the target location 1002 is a location wherein the mobile device rarely goes, then the geo-fence reminder controller 122 increases the geo-fence from geo-fence 1000 to geo-fence 1012 to include the task or the location 1002 (for example, the location of a tailor for the task of picking up altered slacks). The geo-fence is enlarged so that when the mobile device 912 enters the geo-fence 1012, the mobile device issues a reminder notification regarding the target 1002 because it is rare that the mobile device is in the area (e.g., the frequency of visits is low compared to other locations) so that the user is prompted to attend to the task when they are located in areas that they infrequently travel. As such, in this mode, the number of visits to a target location is tabulated and stored in memory 124 or sent to the server 104 for storage in database 106 and is associated with the target location each time the target location is visited.

The server 104 may tabulate the frequency scores for each of the target locations to determine, for example, which target locations are infrequently visited. For those that are infrequently visited, their geo-fences are enlarged compared to a nominal geo-fence if, for example, the frequency score is beyond a threshold. The threshold may be set, for example, by the user through a suitable user interface. For example, using a score scale of 1-10, the user may select the frequency threshold that serves to define what frequency of visits counts as frequent versus infrequent. For example if the frequency is three (i.e., uncommon), then the geo-fence reminder will change the size of the geo-fence to allow a reminder to occur when the mobile device is further away from the infrequently visited location. In another embodiment, the geo-fence reminder controller 122 may maintain a record of the number of visits to each desired target location and determine which target locations are suitable for modification of the geo-fence when the frequency of the locations of the mobile device within the first geo-fence are below a desired threshold. The method includes providing a reminder 608 location such as that shown in FIG. 4 for the target location when the mobile device enters the second geo-fence.

Stated another way, a visitation history is maintained by the geo-fence reminder controller 122 or server 104 of the number of times that each target location is visited within a desired time frame such as within a month or year or any other suitable time frame, to define the uncommon locations and to define common locations that are visited more frequently by the mobile device. The frequency of visitation data, also referred to as the visitation history data, may be stored in any suitable location such as database 106 or locally on the mobile device 102 if desired. As with other embodiments, the method can include shaping the second geo-fence in response to traffic conditions between the current location and the target location.

The methods herein may be used in any combination if desired. As such, the techniques described with respect to FIG. 9 can also be used with techniques described, for example, with respect to FIG. 10.

Referring to FIG. 7 and again to FIG. 10, a description will be provided for the instance where the mobile device 102 receives selection of user mode 304. In this mode, data is used to determine which locations are considered to be common mobile device locations meaning those that historically have been visited with a very high frequency, such as daily or weekly which can correspond, for example, to a user's home or place of work. These locations are shown, for example, as home 914 and office 916 respectively. These locations are considered common mobile device locations and their locations are stored as mobile device common location data either by mobile device 102 or by the server 104 in database 106 and is generated as part of the visitation history data referenced above. As such, as the mobile device 102 visits the target locations, the mobile device 102 or the server 104 may aggregate the number of times the mobile device visits a target location and log this information as visitation history data from which it can be determined which locations are visited most frequently and which are rarely visited. A visited location can include an area instead of an address for example. In one example, a 1 square mile region is set as the location and the number of visitation occurrences over the course of a period of time (e.g., 1 month, 6 months, 1 year) are stored by updating a counter or register of the geo-fence reminder controller 122. The geo-fence reminder controller 122 may also identify the common location as the address of a friend if the address of the common location appears in a contacts list of the mobile device. The geo-fence may be sized to be different depending upon the type of common location. For example, if the common location is a friend's address the geo-fence the geo-fence may be changed but not as large as when the geo-fence is changed when the common location is determined to be a user's residence, for example.

Figure 7:
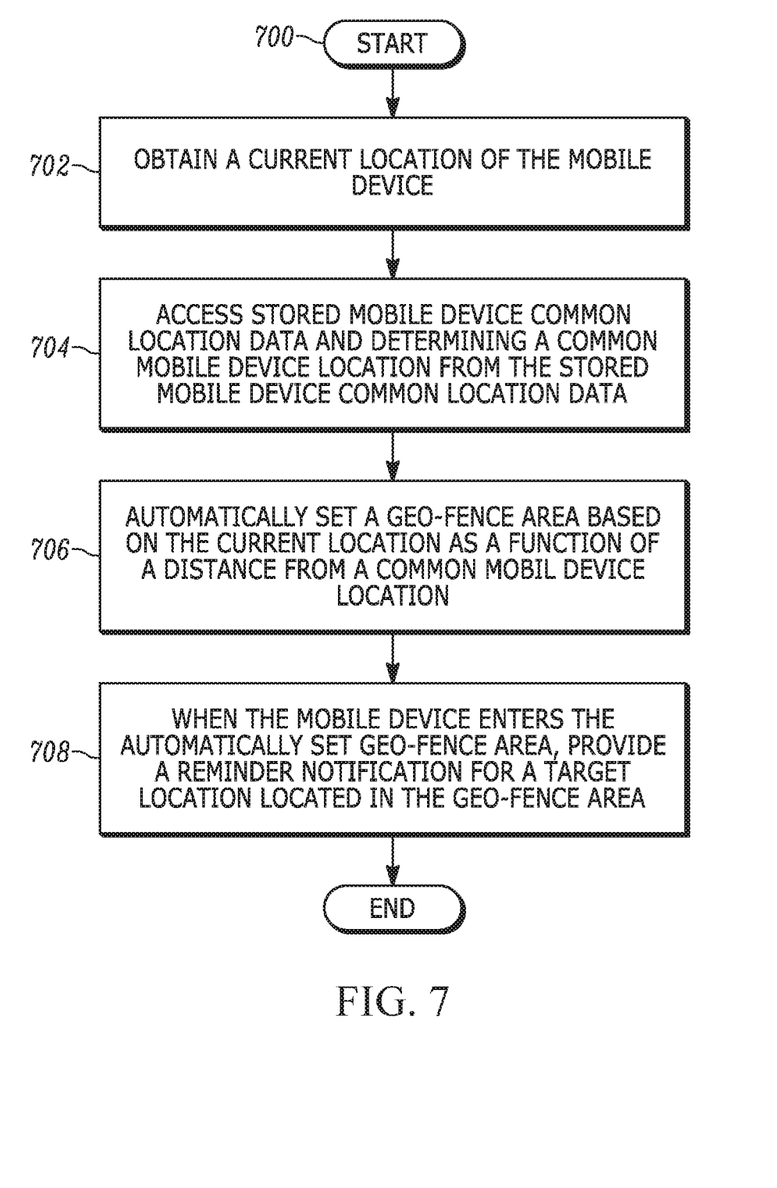
FIG. 7 illustrates one example of a flowchart illustrating one example of a method for providing target location reminders for a mobile device in accordance with one example set forth in the disclosure.

As shown in block 700, the method starts and continues by the geo-fence reminder controller 122 obtaining 702 a current location of the mobile device from location unit 118. The geo-fence reminder controller 122 accesses 704 stored mobile device common location data, either locally or through network 108 when it is available through the server 104, and determines a common mobile device location (e.g., an area or specific address) from the stored mobile device common location data. The common mobile device location may be determined from the stored mobile device common location data (e.g., frequency of visits corresponding to a particular GPS location or other location designation) based on the visitation history data corresponding to the particular location of interest.

The geo-fence reminder controller 122 automatically sets 706 a geo-fence area based on a current location of the mobile device as a function of a distance from a common mobile device location. Referring also to FIG. 10, one example for automatically setting a geo-fence area based on a current location as a function of a distance from a common mobile device location may employ the use of the data below in Table 1 or any other suitable data as desired. The data in Table 1 can be stored in the database 106 or in the mobile device 102 if desired. For example, if the current location of the mobile device indicates that it is twenty miles from a common location such as a location having a frequency score of ten (on a scale of one to ten where the ten is the most frequently visited location) and the target location 1002 (FIG. 10) has a low frequency score meaning that it is not visited very frequently, it may be desirable to increase the geo-fence to a larger geo-fence 1012 so that a notification is provided to the mobile device that the mobile device is within proximity of a rarely visited target location. As such, the geo-fence reminder controller 122 can set the geo-fence area to be larger for geo-fence 1012 to be larger than that of a nominal geo-fence area 1000. When the mobile device enters the automatically set geo-fence area set in block 706, the geo-fence reminder controller 122 provides 708 a reminder notification for a target location located in the automatically set geo-fence area.

TABLE 1

| Target Location Data (includes area) | Visitation History Data | Frequency Score |
|---|---|---|
| GPS Location (Home) | 20 per week | 10 |
| GPS Location (Office) | 10 per week | 8 |
| GPS Location (Pharmacy) | 1 per month | 3 |

Figure 8:
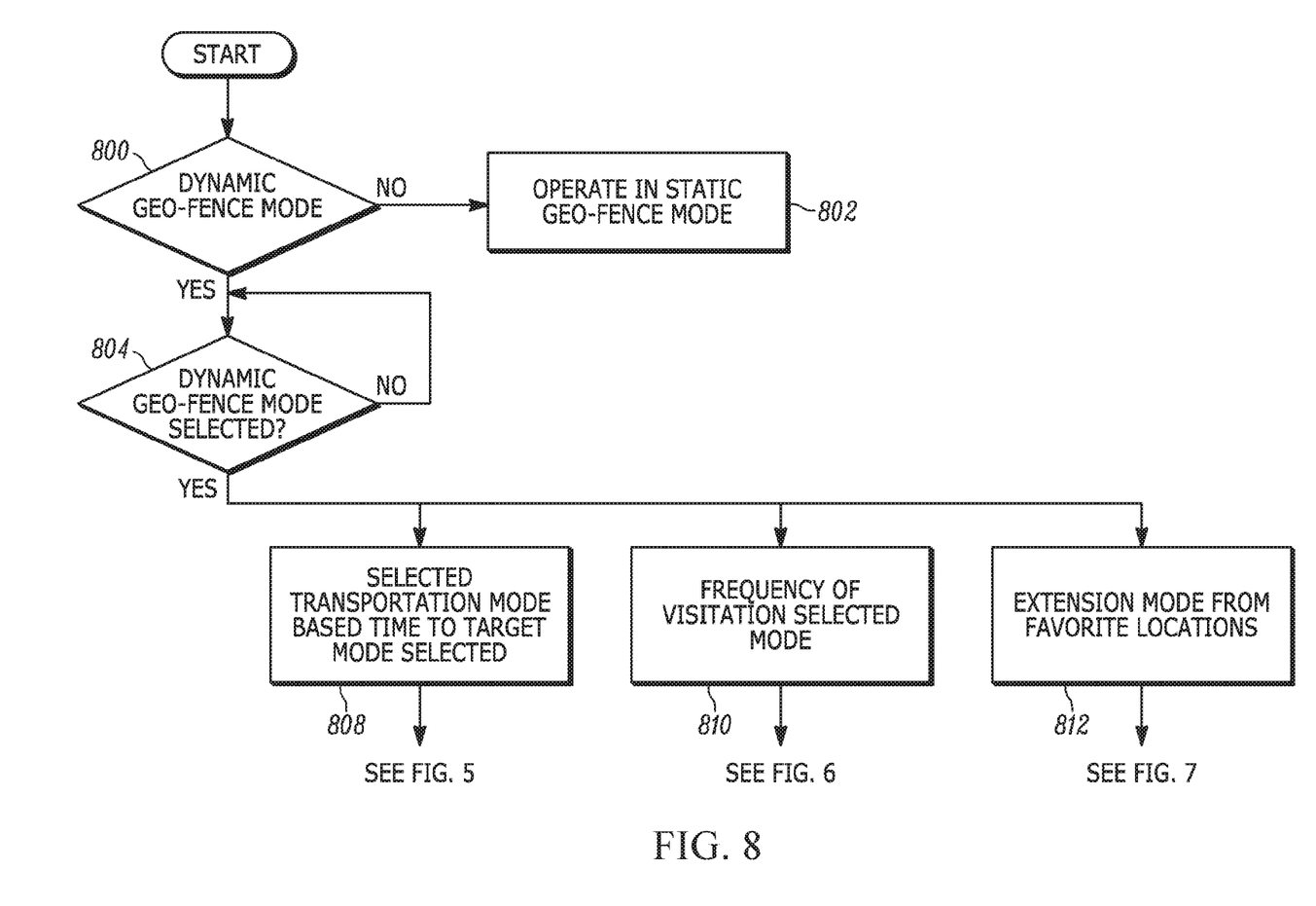
FIG. 8 illustrates one example of a flowchart illustrating one example of a method for providing target location reminders for a mobile device in accordance with one example set forth in the disclosure.

FIG. 8 illustrates one example of a method for providing target location reminders for a mobile device that may be carried out by the geo-fence reminder controller 122 determining whether a dynamic geo-fence mode has been selected as shown in block 800. As previously noted, this may be done, for example, by presenting a graphic user interface shown in FIG. 2. If the geo-fence reminder controller 122 receives a selection to select a static geo-fence mode, the method moves to block 802 where the geo-fence reminder controller operate in a static geo-fence mode as known in the art. However, if the dynamic geo-fence mode is selected, the method includes determining which dynamic geo-fence mode has been selected as shown in block 804. This may be done, for example, by presenting the user interface shown in FIG. 3.

If the transport mode time to reminder target location geo-fence mode 300 is selected as shown in block 808, then the method described in FIG. 5 above may be carried out, if as shown in block 810, the frequency of visits to current location geo-fence mode 302 has been selected, the method described with respect to FIG. 6 may be carried out and if as shown in block 812 the common location geo-fence generation mode is selected, the operation described with respect to FIG. 7 may be carried out.

Figure 12:
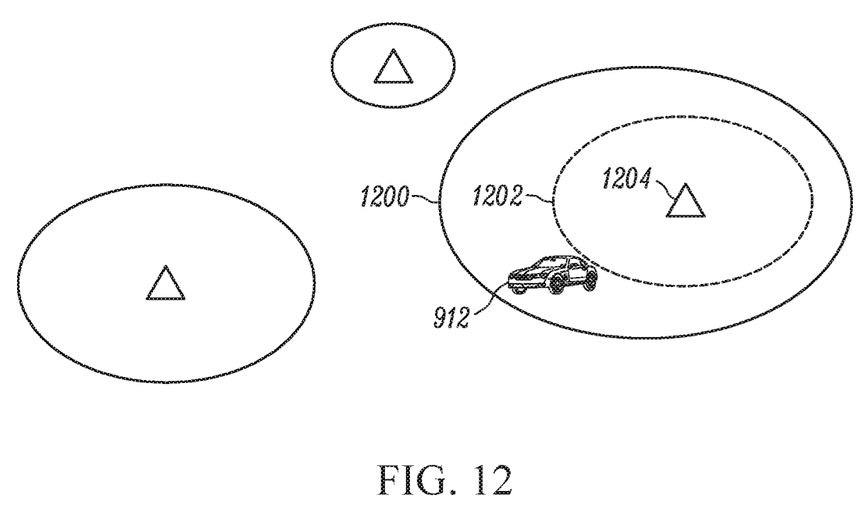
FIG. 12 illustrates one example of a user interface illustrating an example of providing target location reminders for a mobile device in accordance with one example set forth in the disclosure.

FIG. 12 illustrates an embodiment wherein a first geo-fence 1200 is dynamically changed to a smaller geo-fence 1202 (in this example having a smaller area) in response to determining that an estimated travel time for the mobile device to the target location 1204 has been made smaller because, for example, the traffic conditions have changed since the geo-fence 1200 was previously established for the target location 1204. This operation may be carried out as part of block 506 of FIG. 5. For example, if the desired estimated time is five minutes to reach a target location but there has been a change in traffic conditions, for example, due to an accident, the geo-fence reminder controller 122 will dynamically change the geo-fence corresponding to the target location 1204 to become smaller so that the mobile device is not notified of the five minute time to arrival to the target location until the mobile device reaches the perimeter of the now smaller geo-fence 1202.

Among other advantages, a method and apparatus takes into account important factors to determine a geo-fence to be employed with a target location including, but not limited to, the mode of transportation that has been selected, current traffic conditions, estimated time of arrival, the frequency of user visits to a target location and determining a geo-fence radius based on the relative distance from other commonly visited locations to provide a more accurate geo-fence based target reminder system.

In situations in which the systems and methods discussed herein may collect personal information about users, or may make use of personal information (e.g., user data), users are provided with one or more opportunities to control how information is collected about the user and used in one or more described features. A user is provided with control over whether programs or features collect user data (e.g., information about a user's social network, user characteristics (age, gender, profession, etc.), social actions or activities, a user's preferences, content created or submitted by a user, a user's current geographic location, etc.). A user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more control options over a communication network. In addition, certain data may be treated in one or more ways before it is stored or used, so that personally identifiable information is removed. For example, a user's identity may be treated so that no personally identifiable information can be determined for the user, or where appropriate to protect user information, a user's geographic location may be generalized to a larger region so that a particular location of a user cannot be determined.

The above detailed description and the examples described therein have been presented for the purposes of illustration and description only and not for limitation. For example, the operations described may be done in any suitable manner. The method may be done in any suitable order still providing the described operation and results. It is therefore contemplated that the present embodiments cover any and all modifications, variations or equivalents that fall within the spirit and scope of the basic underlying principles disclosed above and claimed herein. Furthermore, while the above description describes hardware in the form of a processor executing code, hardware in the form of a state machine or dedicated logic circuitry capable of producing the same effect are also contemplated.

What is claimed is:

1. A method comprising:
    outputting, by a mobile device, for display, a user interface component indicating a plurality of selectable dynamic geo-fence modes, the plurality of selectable dynamic geo-fence modes including a transport time mode and at least one of a frequency of visits mode and a common location mode;
    receiving, by a geo-fence reminder controller, while the transport time mode is a selected dynamic geo-fence mode, a target location within a first geo-fence, the first geo-fence being associated with a corresponding nominal travel time to reach the received target location from a perimeter of the first geo-fence using a first transportation mode;
    determining, by the geo-fence reminder controller, an estimated travel time for the mobile device to reach the received target location, the estimated travel time being based on a current location of the mobile device, a current mode of transportation of the mobile device, and current traffic conditions;

in response to determining that the estimated travel time for the mobile device to reach the received target location is within a desired temporal range of the nominal travel time, dynamically changing, by the geo-fence reminder controller, the first geo-fence to a second geo-fence, the second geo-fence defining a different area than the first geo-fence; and in response to the mobile device entering the second geo-fence, outputting, by the geo-fence reminder controller, to the user interface and for display, a reminder notification.

2. The method of claim 1 further comprising:
outputting, for display, a user interface component that presents a plurality of transportation modes for selection by a user, wherein a user-selected transportation mode is the first transportation mode.

3. The method of claim 1 further comprising:
determining the nominal travel time to reach the received target location from a perimeter of the first geo-fence based on the first transportation mode and average traffic conditions of the first transportation mode.

4. The method of claim 1 wherein dynamically changing the first geo-fence to a second geo-fence defining a different area comprises:
in response to the estimated travel time being less than or equal to the nominal travel time and the current location of the mobile device being outside the first geo-fence, increasing an area defined by the first geo-fence to the different area defined by the second geo-fence.

5. The method of claim 1 further comprising determining that the estimated travel time for the mobile device to the received target location is within the desired temporal range of the nominal travel time using a second transportation mode different from first transportation mode.

6. The method of claim 1 further comprising:
outputting, for display, a user interface component with selectable static geo-fence mode data and selectable dynamic geo-fence mode data.

7. A method comprising:
obtaining, by a geo-fence reminder controller of a mobile device, an indication of a first geo-fence, the first geo-fence surrounding at least a target location;
in response to determining that a frequency of the mobile device previously visiting locations within the first geo-fence is below a threshold, modifying, by the geo-fence reminder controller, the first geo-fence to establish a second geo-fence, the second geo-fence surrounding at least the target location and defining an area larger than the first geo-fence; and
receiving, by the geo-fence reminder controller, the target location within the second geo-fence, the second geo-fence being associated with a corresponding nominal travel time to reach the received target location from a perimeter of the second geo-fence using a first transportation mode;
determining, by the geo-fence reminder controller, an estimated travel time for the mobile device to reach the received target location, the estimated travel time being based on a current location of the mobile device, a current mode of transportation of the mobile device, and current traffic conditions;
in response to determining that the estimated travel time for the mobile device to reach the received target location is within a desired temporal range of the nominal travel time, dynamically changing, by the geo-fence reminder controller, the second geo-fence to a third geo-fence, the third geo-fence defining a different area than the second geo-fence;
in response to the mobile device entering the third geo-fence, outputting, by the geo-fence reminder controller, to a user interface component and for display a reminder notification.

8. A method comprising:
obtaining, by a geo-fence reminder controller of a mobile device, a current location of the mobile device;
accessing stored mobile device common location data;
determining a common mobile device location from the stored mobile device common location data, the determined common mobile device location being a location frequently visited by the mobile device;
automatically setting a first geo-fence area surrounding at least a target location based on a distance between the current location and the determined common mobile device location;
receiving, by the geo-fence reminder controller, the target location within the first geo-fence area, the first geo-fence area being associated with a corresponding nominal travel time to reach the received target location from a perimeter of the first geo-fence area using a first transportation mode;
determining, by the geo-fence reminder controller, an estimated travel time for the mobile device to reach the received target location, the estimated travel time being based on a current location of the mobile device, a current mode of transportation of the mobile device, and current traffic conditions;
in response to determining that the estimated travel time for the mobile device to reach the received target location is within a desired temporal range of the nominal travel time, dynamically changing, by the geo-fence reminder controller, the first geo-fence area to a second geo-fence area, the second geo-fence area defining a different area than the first geo-fence area; and
in response to the mobile device entering the second geo-fence area, outputting, by the geo-fence reminder controller, to a user interface component and for display, a reminder notification.

9. The method of claim 8 wherein the automatically setting a geo-fence area comprises:
in response to a current mobile device location being a common mobile device location, expanding the first geo-fence area to define a larger area surrounding at least the target location.

10. A mobile device comprising:
a user interface output component; and
logic circuitry operatively coupled to the user interface output component and configured to:
output, to the user interface output component, a user interface component indicating a plurality of selectable dynamic geo-fence modes, the plurality of selectable dynamic geo-fence modes including a transport time mode and at least one of a frequency of visits mode and a common location mode;
receive, while the transport time mode is a selected dynamic geo-fence mode, a target location within a first geo-fence, the first geo-fence being associated with a corresponding nominal travel time to reach the received target location from a perimeter of the first geo-fence using a first transportation mode;
determine an estimated travel time for the mobile device to reach the received target location, the estimated travel time based on a current location of the mobile device, a current mode of transportation of the mobile device, and current traffic conditions;
in response to determining that the estimated travel time for the mobile device to reach the received target location is within a desired temporal range of the nominal travel time, dynamically change the first geo-fence to a second geo-fence, the second geo-fence defining a different area than the first geo-fence; and
in response to the mobile device entering the second geo-fence, output, for display and to the user interface output component, a reminder notification.

11. The mobile device of claim 10 further comprising:
a user interface input component coupled to the logic circuitry,
wherein the logic circuitry is further configured to:
output, to the user interface output component, selectable mode of transportation data;
receive an indication of a selection of a transportation mode using the user interface input component; and
use the selected transportation mode to determine the estimated travel time to reach the received target location by the mobile device for the second geo-fence.

12. The mobile device of claim 10 further comprising:
a location unit operatively coupled to the logic circuitry,
wherein the logic circuitry is further configured to increase, in response to the estimated travel time being less than or equal to the nominal travel time and the current location of the mobile device being outside the first geo-fence, an area defined by the first geo-fence to the different area defined by the second geo-fence.

13. The mobile device of claim 12 further comprising:
a transceiver coupled to a traffic condition database,
wherein the logic circuitry is further configured to shape the second geo-fence in response to traffic conditions between the current location and the received target location.

14. The mobile device of claim 12 wherein the logic circuitry is further configured to output, for display and to the user interface output component, a user interface with selectable static geo-fence mode data and selectable dynamic geo-fence mode data.

15. A mobile device comprising:
a location unit,
a user interface output component; and
logic circuitry, operatively coupled to the location unit and the user interface output component, and configured to:
obtain an indication of a first geo-fence, the first geo-fence surrounding at least a target location;
in response to determining that a frequency of the mobile device previously visiting locations within the first geo-fence is below a threshold, modify the first geo-fence to establish a second geo-fence, the second geo-fence surrounding at least the target location and defining an area larger than the first geo-fence; and
receive the target location within the second geo-fence, the second geo-fence being associated with a corresponding nominal travel time to reach the received target location from a perimeter of the second geo-fence using a first transportation mode;
determine an estimated travel time for the mobile device to reach the received target location, the estimated travel time being based on a current location of the mobile device, a current mode of transportation of the mobile device, and current traffic conditions;
in response to determining that the estimated travel time for the mobile device to reach the received target location is within a desired temporal range of the nominal travel time, dynamically change the second geo-fence to a third geo-fence, the third geo-fence defining a different area than the second geo-fence;
in response to the mobile device entering the third geo-fence, output, to the user interface output component, a reminder notification.

16. A mobile device comprising:
a location unit,
a memory;
a user interface output component; and
logic circuitry, coupled to the location unit, and configured to:
obtain a current location of the mobile device from the location unit;
access stored mobile device common location data from the memory;
determine a common mobile device location from the stored mobile device common location data, the determined common mobile device location being a location frequently visited by the mobile device;
automatically set a first geo-fence area surrounding at least a target location based on a distance between the current location and the determined common mobile device location;
receive the target location within the first geo-fence area, the first geo-fence area being associated with a corresponding nominal travel time to reach the received target location from a perimeter of the first geo-fence area using a first transportation mode;
determine an estimated travel time for the mobile device to reach the received target location, the estimated travel time being based on a current location of the mobile device, a current mode of transportation of the mobile device, and current traffic conditions;
in response to determining that the estimated travel time for the mobile device to reach the received target location is within a desired temporal range of the nominal travel time, dynamically change the first geo-fence area to a second geo-fence area, the second geo-fence area defining a different area than the first geo-fence; and
in response to the mobile device entering the second geo-fence area, output, to the user interface output component, a reminder notification.

17. The mobile device of claim 16 wherein the logic circuitry is operative to automatically set the geo-fence area by expanding, in response to a current mobile device location being a common mobile device location, a first geo-fence area to define a larger third geo-fence area surrounding at least the target location.

* * * * *